United States Patent
Zhang et al.

(10) Patent No.: US 11,222,655 B1
(45) Date of Patent: Jan. 11, 2022

(54) RECORDING HEAD WITH WRITER HMS LESS THAN READER HMS

(71) Applicant: Seagate Technology LLC, Fremont, CA (US)

(72) Inventors: Lihong Zhang, Singapore (SG); Xiong Liu, Singapore (SG); Swee Chuan Gan, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/071,544

(22) Filed: Oct. 15, 2020

(51) Int. Cl.
| | |
|---|---|
| *G11B 5/255* | (2006.01) |
| *G11B 5/187* | (2006.01) |
| *G11B 5/11* | (2006.01) |
| *G11B 5/60* | (2006.01) |
| *G11B 5/31* | (2006.01) |

(52) U.S. Cl.
CPC .............. *G11B 5/255* (2013.01); *G11B 5/11* (2013.01); *G11B 5/1871* (2013.01); *G11B 5/3163* (2013.01); *G11B 5/6082* (2013.01)

(58) Field of Classification Search
None
See application file for complete search history.

(56) References Cited

U.S. PATENT DOCUMENTS

| | | | | |
|---|---|---|---|---|
| 5,822,153 A * | 10/1998 | Lairson | .............. | G11B 5/4886 360/234.7 |
| 5,909,340 A * | 6/1999 | Lairson | .............. | G11B 5/4886 360/237.1 |
| 5,985,163 A | 11/1999 | Cha et al. | | |
| 5,986,851 A | 11/1999 | Angelo et al. | | |
| 5,991,119 A * | 11/1999 | Boutaghou | .............. | G11B 5/40 360/234.7 |
| 6,646,828 B1 | 11/2003 | Sasaki | | |
| 7,023,658 B1 * | 4/2006 | Knapp | .............. | G11B 5/3116 360/122 |
| 7,502,205 B1 | 3/2009 | Hurtado et al. | | |
| 7,898,765 B2 | 3/2011 | Hachisuka | | |
| 9,324,351 B2 | 4/2016 | Kong et al. | | |
| 9,659,587 B1 | 5/2017 | Khamnualthong et al. | | |
| 9,666,229 B1 | 5/2017 | Kaddeche | | |
| 9,792,935 B2 | 10/2017 | Rejda et al. | | |
| 9,966,237 B2 * | 5/2018 | Biskeborn | .......... | H01J 37/32816 |
| 10,049,689 B2 | 8/2018 | Stephan et al. | | |
| 2004/0027717 A1 | 2/2004 | Alfoqaha et al. | | |
| 2004/0037003 A1 | 2/2004 | Tsubota et al. | | |
| 2005/0237665 A1 * | 10/2005 | Guan | .............. | G11B 5/315 360/125.15 |
| 2005/0243473 A1 | 11/2005 | Hu et al. | | |
| 2007/0109686 A1 | 5/2007 | Jose et al. | | |
| 2010/0265618 A1 | 10/2010 | Boutaghou et al. | | |
| 2014/0063646 A1 * | 3/2014 | Biskeborn | ............ | G11B 5/3967 360/75 |

OTHER PUBLICATIONS

Application and Drawings for U.S. Appl. No. 16/459,765, dated Jul. 2, 2019, 28 pages.

* cited by examiner

*Primary Examiner* — William J Klimowicz
(74) *Attorney, Agent, or Firm* — Westman, Champlin & Koehler, P.A.

(57) ABSTRACT

An apparatus includes a recording head for reading and writing data on a data storage medium. The recording head includes a reader having a first media-confronting surface. The recording head also includes a main write pole having a second media-confronting surface that protrudes in front of the first media-confronting surface.

13 Claims, 4 Drawing Sheets

RECORDING HEAD WITH WRITER HMS LESS THAN READER HMS

SUMMARY

In one embodiment, an apparatus is provided. The apparatus includes a recording head for reading and writing data on a data storage medium. The recording head includes a reader having a first media-confronting surface. The recording head also includes a main write pole having a second media-confronting surface that protrudes in front of the first media-confronting surface.

In another embodiment, a method is provided. The method includes forming a wafer including a reader with a reader exposed surface and a writer with a writer exposed surface. The writer exposed surface protrudes in front of the reader exposed surface.

In yet another embodiment, a data storage device is provided. The data storage device includes a data storage medium having a data storage surface. The data storage device also includes a recording head that reads data from and writes data to the data storage surface. The recording head includes a reader having a first media-confronting surface, and a main write pole having a second media-confronting surface. The second media-confronting surface protrudes in front of the first media-confronting surface. The recording head also includes a first write shield having a third media-confronting surface and a second write shield having a fourth media-confronting surface. The second, third and fourth media-confronting surfaces are substantially coplanar.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to recording heads for reading data from and writing data to data storage media. In embodiments of the disclosure, the recording head is configured to provide a writer head-media spacing (HMS) that is less than a reader HMS. Prior to providing details regarding the different embodiments, a description of an illustrative operating environment is provided below.

Figure 1:
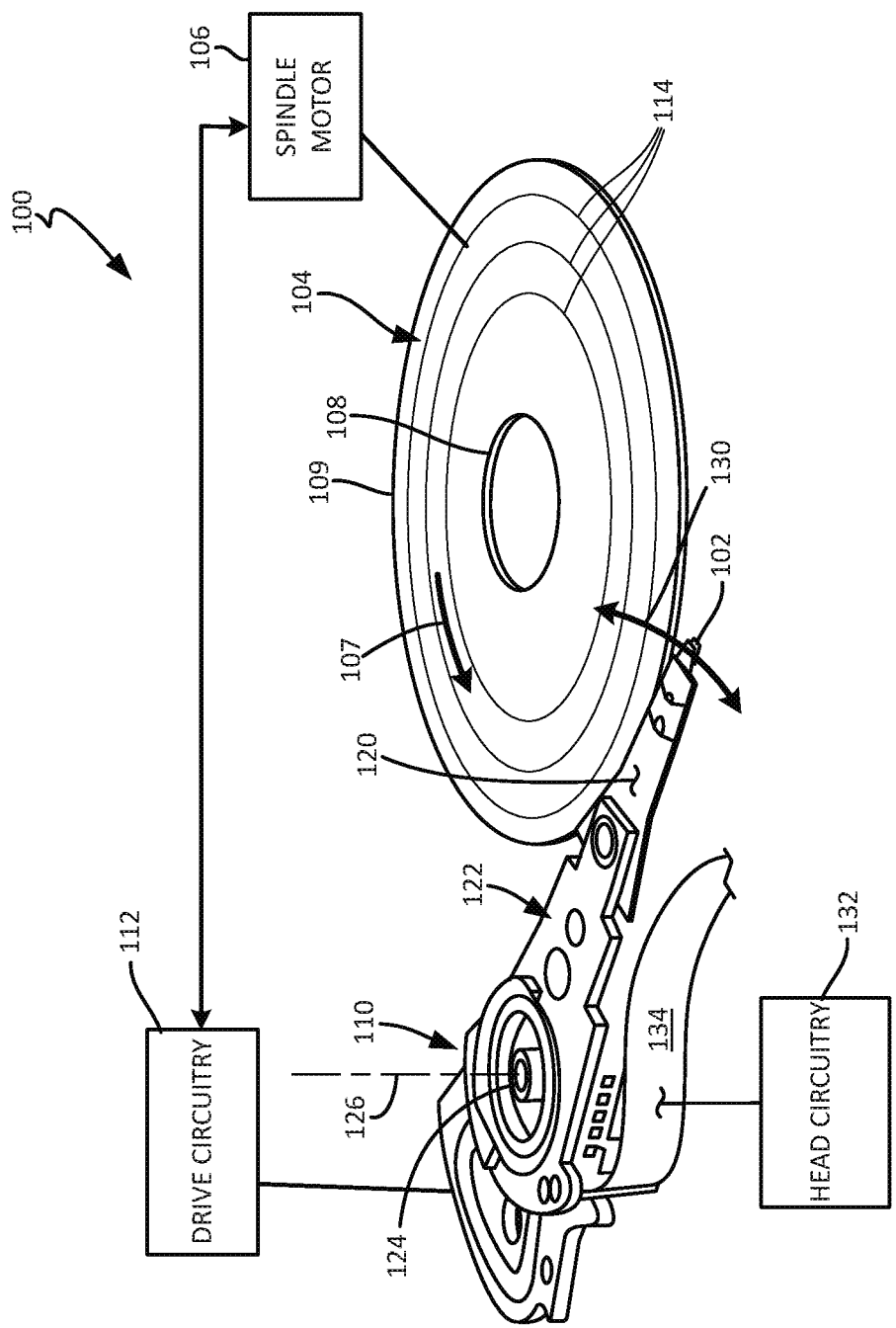
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including a data storage medium 104 and a head 102 for reading data from and/or writing data to the data storage medium. Data storage device 100 may be characterized as a hard disc drive (HDD). In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110, for example through a swage connection. Although FIG. 1 illustrates a single load beam 120 coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
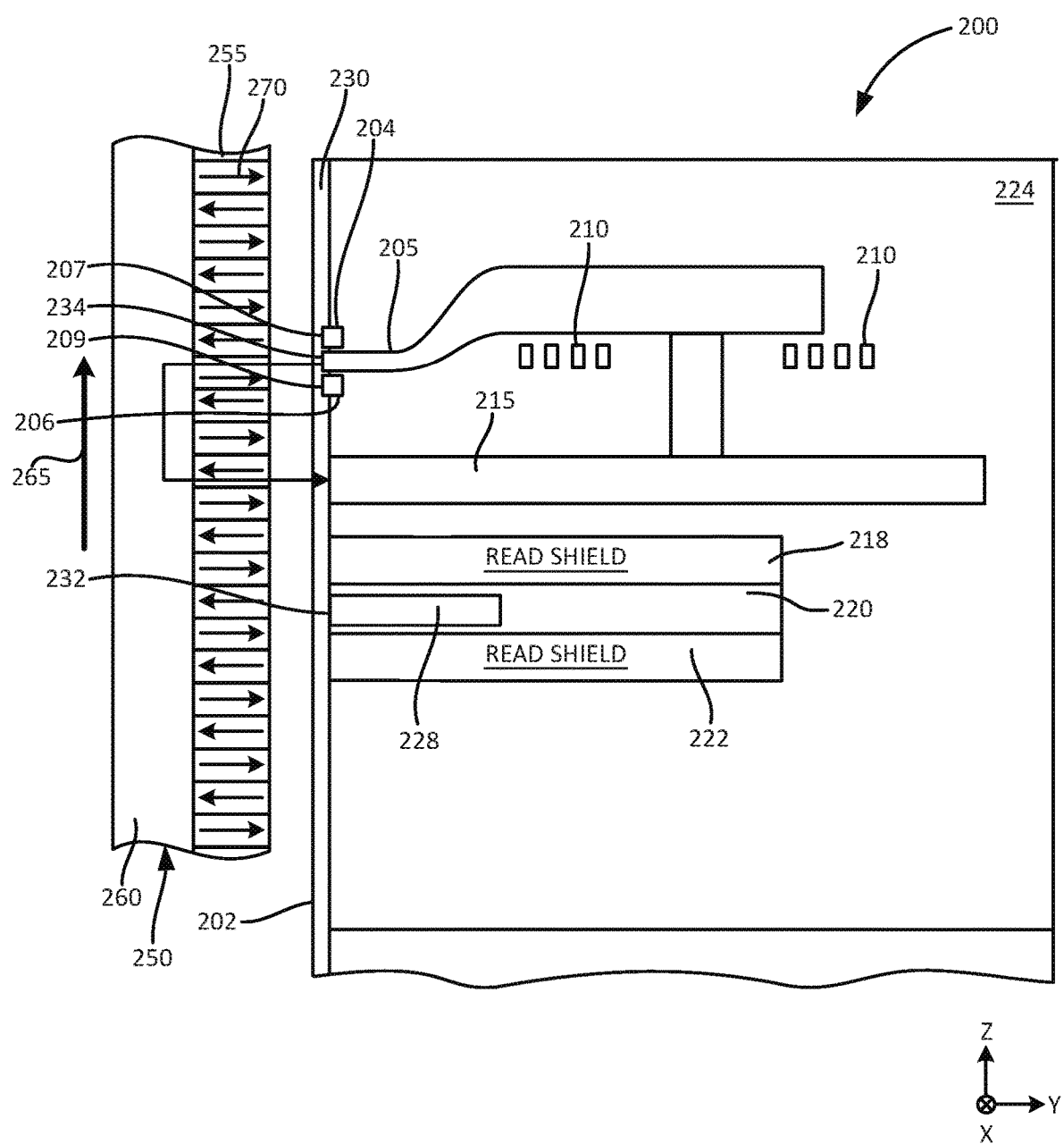
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Layers of recording head 200 may be stacked along a track direction (e.g., a z-direction in FIG. 2). A track width direction is perpendicular to the track direction (e.g., a cross-track direction, which is an x-direction in FIG. 2). A y-direction in FIG. 2 is then defined as a direction that is perpendicular to x and z simultaneously, which is a stripe-height direction. Recording head 200 includes a first write shield 204, a main write pole (sometimes referred to herein as a writer) 205, a second write shield 206, a magnetization coil 210, a return pole 215, a first read shield 218, a read transducer or reader 220, a second read shield 222, and a head basecoat at the trailing end 224. In some embodiments, read transducer 220 may include a magnetoresistive sensor 228. In the interest of brevity, certain structural details of writer 205 and reader 220 are not provided herein.

Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from main write pole 205, through recording layer 255, into underlayer 260, and across to return pole 215. The magnetic field illustratively records a magnetization pattern 270 in recording layer 255. Read transducer 220 senses or detects magnetization patterns in recording layer 255 with the help of sensor 228, and is used in retrieving information previously recorded to layer 255.

Certain current HDDs may face high failure rates during single-head-stress-tests (SHSTs) for reliability. Such failures are mainly due to burnish-induced reader degradations, and may be reduced by increasing a thickness of a head-overcoat (HOC) (e.g., from 15 Angstroms (Å) to 16 Å or 17 Å). However, increasing the HOC thickness by, for example, 2 Å to protect the reader also increases write HMS by 2 Å, which erodes areal density capability (ADC).

Embodiments of the disclosure reduce the impact of write magnetic spacing while increasing the HOC for SHST. In embodiments of the disclosure, this is carried out by employing a thin HOC (or no HOC) on the main write pole and a relatively thick HOC on the reader. Accordingly, in the embodiment shown in FIG. 2, different HOC 230 thicknesses are employed for the reader 220 and the main write pole 205. The HOC 230 is thinner on the main write pole 205 than it is on the reader 220.

As can be seen in FIG. 2, reader 220 has a first media-confronting surface 232 and main writer pole 205 has a second media-confronting surface 234 that protrudes in front of the first media-confronting surface 232. Thus, a separation distance between the second media-confronting surface 234 and the data storage medium 250 (e.g., the writer 205 HMS) is less than a separation distance between the first media-confronting surface 232 and the data storage medium 250 (e.g., the reader 220 HMS). Further, first write shield 204 has a third media-confronting surface 207, and second write shield 206 has a fourth media-confronting surface 209. The second, third and fourth media-confronting surfaces (234, 207 and 209) may be substantially coplanar. Surfaces 207 and 209 may be flat or sloping. In general, at least portions of surfaces 207 and 209 are coplanar with surface 234.

Figure 3A:
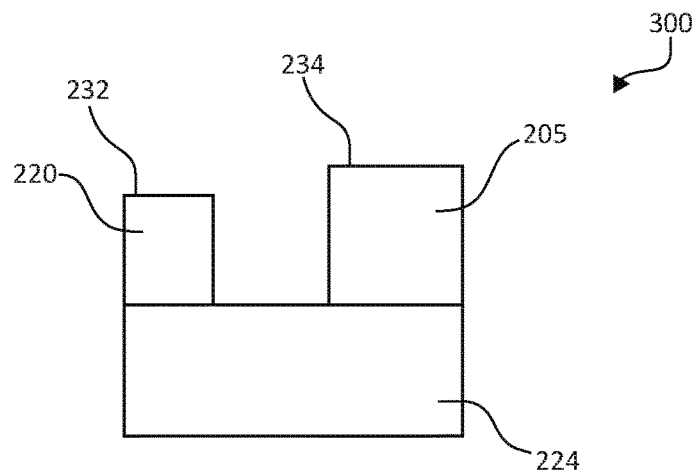
FIGS. 3A-3F are diagrammatic illustrations that together show a method of forming a recording head in accordance with one embodiment.

FIGS. 3A-3F are diagrammatic illustrations showing the formation of a recording head in accordance with one embodiment. As shown in FIG. 3A, a wafer 300 is first formed with a reader 220 and a main writer pole or writer 205. Element 224 may be an insulator. Reader 220 and writer 205 are formed such that a second media-confronting surface 234 of writer 205 protrudes in front of a first media-confronting surface 232 of reader 220. In the interest of simplification, write shields, read shields, return pole(s), etc. are not shown.

Magnetic recording head transducers (e.g., reader 220 and writer 205) are formed at a slider trailing edge which includes multi-layers of conductive, non-conductive, magnetic and non-magnetic materials. The fabrication of the read transducer or reader, the write transducer or writer including the poles, shields and the contact detection sensor may be achieved by using techniques similar to complementary metal oxide semiconductor (CMOS) fabrication processes. Film deposition may be achieved by techniques involving sputtering, ion beam deposition and/or electrodeposition. Patterning of the structures is usually carried out by ultraviolet (UV) lithography and/or electron beam lithography. A post-annealing process may be employed for magnetic domain control and coupling of the MR (e.g., giant MR (GMR)) sensor.

A height of the writer protrusion with respect to the reader towards the media-facing direction may be controlled by controlling the deposition conditions for the reader and writer fabrication (e.g., sputtering duration and/or sputtering power, etc.).

Lapping processes to smoothen the slider and transducer area surfaces may remove some of the deposited materials. The selected sputtering conditions for writer main pole stripe height with respective to the read transducer or reader may reference experimentally analyzed results using physical profile analyzing tools such as an atomic-force-microscope (AFM).

Figure 3B:
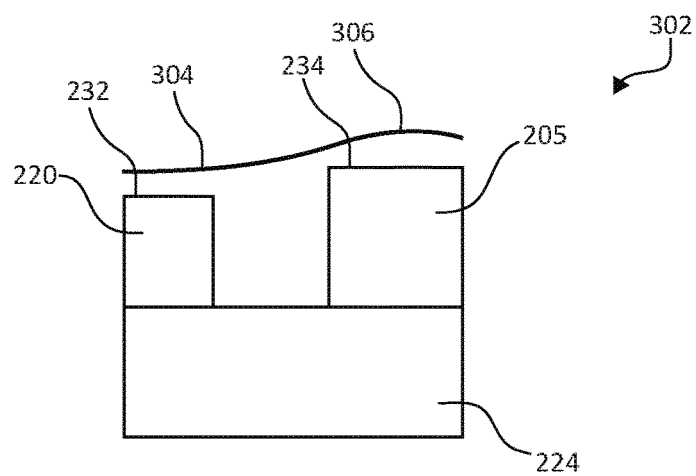

In FIG. 3B, a HOC 230 is formed (e.g., deposited) over the wafer 300 including the reader 220 and the writer 205 to form intermediate structure 302. HOC may be a non-magnetic overcoat that includes at least one of diamond-like-carbon (DLC), SiC, $HfO_x$, $TiO_x$, Si-doped DLC or N-doped DLC. HOC 230 has a relatively uniform thickness over the reader 220 and the writer 205. HOC 230 has a first exposed surface 304 over the reader 220 and a second exposed surface 306 over the writer 205.

Figure 3C:
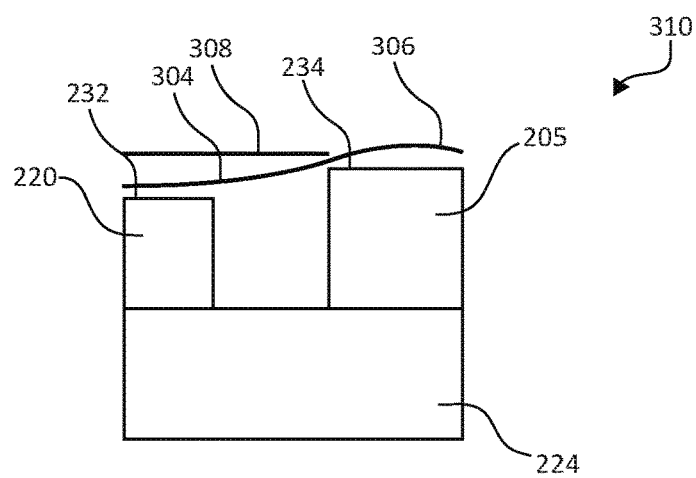

In FIG. 3C, a mask 308 that covers the first exposed surface 304 and any surface portions other than the second exposed surface 306 over the writer 205 is formed. In other words, second surface 306 is left exposed, and other surfaces are covered. This provides another intermediate structure 310.

Figure 3D:
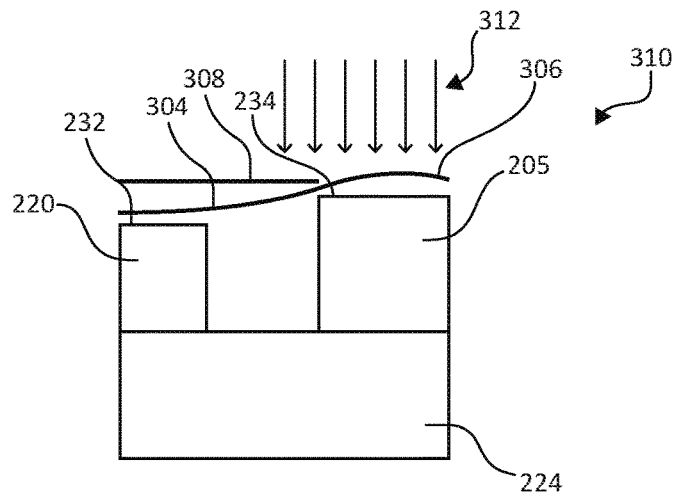

In FIG. 3D, HOC 230 on the writer 205 is made thinner (or completely removed) by an etching process 312 (e.g., a reactive ion etching (RIE) process carried out in an RIE chamber). This provides intermediate structure 314 shown in FIG. 3E.

Figure 3E:
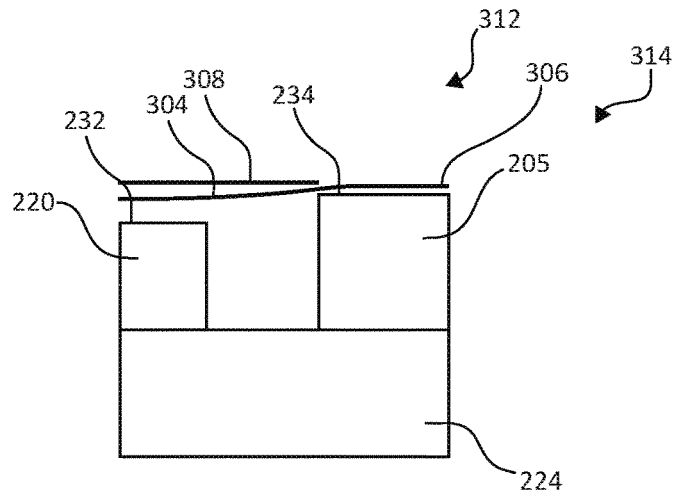
Figure 3F:
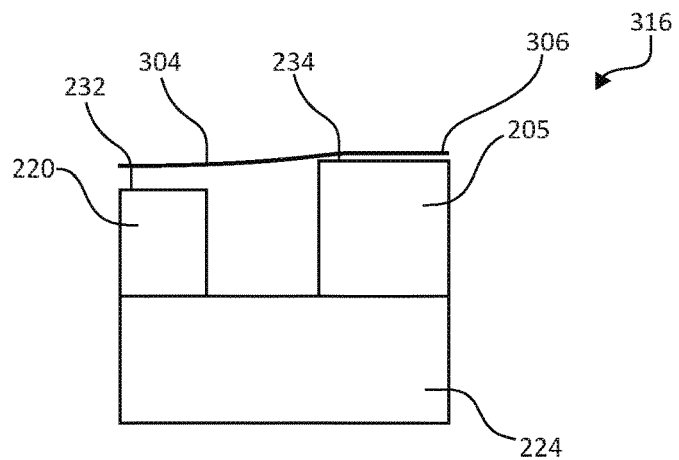

Mask 308 is then lifted using a suitable process, to provide structure 316 shown in FIG. 3F. Additional processes, which are not described in the interest of brevity, may be carried out to form a finished recording head. It should be noted that, in some embodiments, a lubricant may be applied to a top or upper surface of structure 316.

In certain embodiments, instead of carrying out etching-related processes shown in FIGS. 3C-3E, deposition of HOC 230 may be controlled such that the portion of HOC 230 over the reader 220 is thicker than the portion of HOC 230 over the writer 205. Further, in some such embodiments, the deposition of HOC 230 may be controlled such that the a portion of HOC 230 is present over reader 220 and no HOC is present over writer 205.

It should be noted that, in the above described embodiments, the overcoat portion over the writer is made thinner than the overcoat portion over the reader because the overcoat portion over the writer may protrude to an extent that could cause collisions between that overcoat portion and the data storage medium during read/write operations. In general, the writer is more robust than the reader, and therefore less or no overcoat protection may be utilized for the writer.

Although not shown in FIG. 3A-3F in the interest of simplification, as noted earlier, write shields 204 and 206 (shown in FIG. 2) may be formed with media-confronting surfaces 207 and 209, respectively, which are substantially coplanar with media-confronting surface 234 of writer 205.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
a recording head for reading and writing data on a data storage medium, the recording head comprising:
a reader having a first media-confronting surface;
a main write pole having a second media-confronting surface that protrudes in front of the first media-confronting surface; and
a return pole having a third media-confronting surface that is coplanar with the first media-confronting surface,
wherein the main write pole is configured to generate a magnetic field that passes from the main write pole through a recording layer of the data storage medium, and from the data storage medium to the return pole, and wherein a first path of the magnetic field from the second media-confronting surface of the main write pole to a head-confronting surface of the data storage medium is shorter than a second path of the magnetic field from the head-confronting surface of the data storage medium to the third media-confronting surface of the return pole.

2. The apparatus of claim 1 and further comprising a first overcoat portion that covers the first media-confronting surface and has a first thickness, and a second overcoat portion that covers the second media-confronting surface and has a second thickness, which is less than the first thickness.

3. The apparatus of claim 2 and wherein:
the recording head further comprises a bearing surface;
the first overcoat portion comprises a first exposed surface that forms a first portion of the bearing surface; and
the second overcoat portion comprises a second exposed surface that forms a second portion of the bearing surface.

4. The apparatus of claim 2 and wherein the recording head further comprises:
a first write shield having a fourth media-confronting surface; and
a second write shield having a fifth media-confronting surface,
wherein the second, fourth and fifth media-confronting surfaces are substantially coplanar.

5. The apparatus of claim 1 and further comprising an overcoat portion that covers the first media-confronting surface, and the second media-confronting surface has no overcoat.

6. The apparatus of claim 5 and wherein:
the recording head further comprises a bearing surface;
the overcoat portion comprises an exposed surface that forms a first portion of the bearing surface; and the second media-confronting surface forms a second portion of the bearing surface.

7. The apparatus of claim 1 and further comprising the data storage medium, wherein the second media-confronting surface that protrudes in front of the first media-confronting surface is closer to the data storage medium than the first media-confronting surface when the recording head is positioned over the data storage medium.

8. A data storage device comprising:
   a data storage medium having a data storage surface;
   a recording head that reads data from and writes data to the data storage surface, the recording head comprising:
      a reader having a first media-confronting surface;
      a main write pole having a second media-confronting surface that protrudes in front of the first media-confronting surface;
      a return pole having a third media-confronting surface that is coplanar with the first media-confronting surface;
      a first write shield having a fourth media-confronting surface; and
      a second write shield having a fifth media-confronting surface,
   wherein the second, fourth and fifth media-confronting surfaces are substantially coplanar, and
   wherein the main write pole is configured to generate a magnetic field that passes from the main write pole through a recording layer of the data storage medium, and from the data storage medium to the return pole, and wherein a first path of the magnetic field from the second media-confronting surface of the main write pole to a head-confronting surface of the data storage medium is shorter than a second path of the magnetic field from the head-confronting surface of the data storage medium to the third media-confronting surface of the return pole.

9. The data storage device of claim 8 and further comprising a first overcoat portion that covers the first media-confronting surface and has a first thickness, and a second overcoat portion that covers the second media-confronting surface and has a second thickness, which is less than the first thickness.

10. The data storage device of claim 9 and wherein:
    the recording head further comprises a bearing surface;
    the first overcoat portion comprises a first exposed surface that forms a first portion of the bearing surface; and
    the second overcoat portion comprises a second exposed surface that forms a second portion of the bearing surface.

11. The data storage device of claim 9 and wherein the first overcoat portion and the second overcoat portion comprise at least one of diamond-like-carbon, SiC, $HfO_x$, $TiO_x$, Si-doped DLC or N-doped DLC.

12. The data storage device of claim 8 and further comprising an overcoat portion that covers the first media-confronting surface, and the second media-confronting surface has no overcoat.

13. The data storage device of claim 12 and wherein:
    the recording head further comprises a bearing surface;
    the overcoat portion comprises an exposed surface that forms a first portion of the bearing surface; and
    the second media-confronting surface forms a second portion of the bearing surface.

* * * * *